(12) United States Patent
Ogawa et al.

(10) Patent No.: US 8,730,891 B2
(45) Date of Patent: May 20, 2014

(54) WIRELESS COMMUNICATION APPARATUS AND WIRELESS COMMUNICATION METHOD

(75) Inventors: Yoshihiko Ogawa, Kanagawa (JP); Akihiko Nishio, Kanagawa (JP); Daichi Imamura, Kanagawa (JP); Kenichi Miyoshi, Kanagawa (JP); Megumi Ichikawa, legal representative, Kanagawa (JP); Seigo Nakao, Kanagawa (JP); Takashi Iwai, Ishikawa (JP); Yasuaki Yuda, Kanagawa (JP); Ayako Horiuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 13/256,588

(22) PCT Filed: Mar. 15, 2010

(86) PCT No.: PCT/JP2010/001838
§ 371 (c)(1),
(2), (4) Date: Oct. 3, 2011

(87) PCT Pub. No.: WO2010/106783
PCT Pub. Date: Sep. 23, 2010

(65) Prior Publication Data
US 2012/0113912 A1 May 10, 2012

(30) Foreign Application Priority Data
Mar. 16, 2009 (JP) ................................. 2009-063032

(51) Int. Cl.
H04W 4/00 (2009.01)
(52) U.S. Cl.
USPC .......................................... 370/329; 370/327

(58) Field of Classification Search
USPC .................................. 370/322, 324, 327, 329
See application file for complete search history.

(56) References Cited

U.S. PATENT DOCUMENTS

| | | | |
|---|---|---|---|
| 2009/0040919 A1* | 2/2009 | Muharemovic et al. | 370/210 |
| 2009/0245193 A1* | 10/2009 | Gaal et al. | 370/329 |

(Continued)

FOREIGN PATENT DOCUMENTS

| | | |
|---|---|---|
| JP | 2009-49541 | 3/2009 |
| WO | 2008/085959 | 7/2008 |

OTHER PUBLICATIONS

International Search Report dated Jun. 8, 2010.

(Continued)

*Primary Examiner* — Hassan Phillips
*Assistant Examiner* — Siren Wei
(74) *Attorney, Agent, or Firm* — Dickinson Wright PLLC

(57) ABSTRACT

Disclosed is a wireless communication apparatus and wireless communication method wherein flexible frequency scheduling is performed without increasing the scale of the DFT (Discrete Fourier Transform) circuitry. For example, when resource allocation information is reported indicating whether or not a resource has been allocated to each of a plurality of RBGs (RB groups) into which the system bandwidth is divided, as in Type 0 allocation, if the number of reported RBs reported by the resource allocation information cannot be expressed as "$2^n \times 3^m \times 5^l$", an allocated RB number setting section (208) sets the number of allocated resource blocks used in the actual transmission band, corresponding to the reported RB number, to the number of resource blocks that can be represented by any of "$2^n \times 3^m \times 5^l$", and an allocated RB selection section (209); selects the allocated RB employed in the actual transmission band from the resource allocation information and allocated RB number.

8 Claims, 23 Drawing Sheets

(56) References Cited

U.S. PATENT DOCUMENTS

2010/0061346 A1* 3/2010 Wang et al. .................... 370/336
2010/0091725 A1* 4/2010 Ishii .............................. 370/329
2011/0026471 A1   2/2011 Miki

OTHER PUBLICATIONS

3GPP TS 36.211 V8.5.0, "Evolved Universal Terrestrial Radio Access (E-UTRA); Physical Channels and Modulation," Release 8, Technical Specification Group Radio Access Network, Dec. 2008, pp. 1-82.

3GPP TS 36.213 V8.4.0, "Evolved Universal Terrestrial Radio Access (E-UTRA); Physical Layer Procedures," Release 8, Technical Specification Group Radio Access Network, Sep. 2008, pp. 1-60.

* cited by examiner

| NOTIFIED NUMBER OF RBS | |
|---|---|
| 4 | ○ |
| 8 | ○ |
| 12 | ○ |
| 16 | ○ |
| 20 | ○ |
| 24 | ○ |
| 28 | × |
| 32 | ○ |
| 36 | ○ |
| 40 | ○ |
| 44 | × |
| 48 | ○ |
| 52 | × |
| 56 | × |
| 60 | ○ |
| 64 | ○ |
| 68 | × |
| 72 | ○ |
| 76 | × |
| 80 | ○ |
| 84 | × |
| 88 | × |
| 92 | × |
| 96 | ○ |
| 100 | ○ |
| 104 | × |
| 108 | ○ |
| 112 | × |
| 116 | × |
| 120 | ○ |

FIG.3

| NOTIFIED NUMBER OF RBS | | NUMBER OF RBS TO ASSIGN |
|---|---|---|
| 4 | | 4 |
| 8 | | 8 |
| 12 | | 12 |
| 16 | | 16 |
| 20 | | 20 |
| 24 | | 24 |
| 28 | → | 27 |
| 32 | | 32 |
| 36 | | 36 |
| 40 | | 40 |
| 44 | → | 45 |
| 48 | | 48 |
| 52 | → | 50 |
| 56 | → | 54 |
| 60 | | 60 |
| 64 | | 64 |
| 68 | → | 72 |
| 72 | | 72 |
| 76 | → | 75 |
| 80 | | 80 |
| 84 | → | 81 |
| 88 | → | 90 |
| 92 | → | 90 |
| 96 | | 96 |
| 100 | | 100 |
| 104 | → | 108 |
| 108 | | 108 |
| 112 | → | 108 |
| 116 | → | 120 |
| 120 | | 120 |

FIG.6

| NOTIFIED NUMBER OF RBS | | NUMBER OF RBS TO ASSIGN |
|---|---|---|
| 4 | | 4 |
| 8 | | 8 |
| 12 | | 12 |
| 16 | | 16 |
| 20 | | 20 |
| 24 | | 24 |
| 28 | → | 30 |
| 32 | | 32 |
| 36 | | 36 |
| 40 | | 40 |
| 44 | → | 45 |
| 48 | | 48 |
| 52 | → | 54 |
| 56 | → | 60 |
| 60 | | 60 |
| 64 | | 64 |
| 68 | → | 72 |
| 72 | | 72 |
| 76 | → | 80 |
| 80 | | 80 |
| 84 | → | 90 |
| 88 | → | 90 |
| 92 | → | 96 |
| 96 | | 96 |
| 100 | | 100 |
| 104 | → | 108 |
| 108 | | 108 |
| 112 | → | 120 |
| 116 | → | 120 |
| 120 | | 120 |

FIG.7

| NOTIFIED NUMBER OF RBS | | NUMBER OF RBS TO ASSIGN |
|---|---|---|
| 4 | | 4 |
| 8 | | 8 |
| 12 | | 12 |
| 16 | | 16 |
| 20 | | 20 |
| 24 | | 24 |
| 28 | → | 27 |
| 32 | | 32 |
| 36 | | 36 |
| 40 | | 40 |
| 44 | → | 40 |
| 48 | | 48 |
| 52 | → | 50 |
| 56 | → | 54 |
| 60 | | 60 |
| 64 | | 64 |
| 68 | → | 64 |
| 72 | | 72 |
| 76 | → | 75 |
| 80 | | 80 |
| 84 | → | 81 |
| 88 | → | 81 |
| 92 | → | 90 |
| 96 | | 96 |
| 100 | | 100 |
| 104 | → | 100 |
| 108 | | 108 |
| 112 | → | 108 |
| 116 | → | 108 |
| 120 | | 120 |

FIG.8

| NOTIFIED NUMBER OF RBS | | NUMBER OF RBS TO ASSIGN |
|---|---|---|
| 4 | | 4 |
| 8 | | 8 |
| 12 | | 12 |
| 16 | | 16 |
| 20 | | 20 |
| 24 | | 24 |
| 28 | → | 30 |
| 32 | | 32 |
| 36 | | 36 |
| 40 | | 40 |
| 44 | → | 45 |
| 48 | | 48 |
| 52 | → | 50 |
| 56 | → | 54 |
| 60 | | 60 |
| 64 | | 64 |
| 68 | → | 72 |
| 72 | | 72 |
| 76 | → | 75 |
| 80 | | 80 |
| 84 | → | 81 |
| 88 | → | 90 |
| 92 | → | 96 |
| 96 | | 96 |
| 100 | | 100 |
| 104 | → | 108 |
| 108 | | 108 |
| 112 | → | 108 |
| 116 | → | 120 |
| 120 | | 120 |

FIG.9

| NOTIFIED NUMBER OF RBS | | NUMBER OF RBS TO ASSIGN |
|---|---|---|
| 4 | | 4 |
| 8 | | 8 |
| 12 | | 12 |
| 16 | | 16 |
| 20 | | 20 |
| 24 | | 24 |
| 28 | → | 2 |
| 32 | | 32 |
| 36 | | 36 |
| 40 | | 40 |
| 44 | → | 3 |
| 48 | | 48 |
| 52 | → | 5 |
| 56 | → | 6 |
| 60 | | 60 |
| 64 | | 64 |
| 68 | → | 9 |
| 72 | | 72 |
| 76 | → | 10 |
| 80 | | 80 |
| 84 | → | 15 |
| 88 | → | 18 |
| 92 | → | 25 |
| 96 | | 96 |
| 100 | | 100 |
| 104 | → | 27 |
| 108 | | 108 |
| 112 | → | 30 |
| 116 | → | 45 |
| 120 | | 120 |

FIG.10

WIRELESS COMMUNICATION APPARATUS AND WIRELESS COMMUNICATION METHOD

TECHNICAL FIELD

The present invention relates a radio communication apparatus and a radio communication method in a radio communication system that assigns a data signal to a non-continuous band.

BACKGROUND ART

In the 3GPP LTE (3rd Generation Partnership Project Long Term Evolution) uplink, only a continuous band assignment of a data signal is supported. In the LTE uplink, furthermore, the number of assignable RBs (Resource Blocks) is only limited to numbers of RBs which can be represented by "$2^n \times 3^m \times 5^l$" (n, m and l are integers which are equal to or greater than zero) in order to reduce a scale of a DFT (Discrete Fourier Transform) circuit (see Non-Patent Literature 1).

On the other hand, in the LTE-A (LTE-Advanced) uplink, the support of the non-continuous band assignment of the data signal is investigated to enhance a frequency scheduling effect (see FIG. 1). The non-continuous assignment has already been applied to an LTE down link. In the LTE down link, there is used a type 0 assignment for giving an RB assignment notice in a non-continuous assignment in a bit map (see Non-Patent Literature 2). In the type 0 assignment, it is possible to reduce a signaling quantity of the RB assignment notice. Also in the LTE-A uplink, therefore, it is strong to apply the type 0 assignment to the RB assignment notice in the non-continuous assignment.

With reference to FIG. 2, the type 0 assignment will be described. In the type 0 assignment, P continuous RBs are formed into a single RB group (RBG: Resource Block Group) and a signaling bit (1 or 0) indicating whether a resource is assigned in an RBG unit is set, and a bit map constituted by the signaling bits is given as a notice. A terminal apparatus (which will be hereinafter referred to as a "terminal") decides that a resource of P (RB) in an RBG having a signaling bit of 1 is assigned as a transmission band and a resource of P (RB) in an RBG having a signaling bit of 0 is assigned as a transmitting band in a bit map. In the LTE down link, an RBG size (P) is varied every system bandwidth (see Table 1).

TABLE 1

| System BW (RB) | RBG size (P) |
|---|---|
| <= 10 | 1 |
| 11-26 | 2 |
| 27-63 | 3 |
| 64-110 | 4 |

CITATION LIST

Patent Literature

NPL 1
TS 36.211 v8.5.0 "3GPP TSG RAN; Evolved Universal Terrestrial Radio Access (E-UTRA); Physical Channel and Modulation"
NPL 2
7.1.6 TS 36.213 v8.4.0 "3GPP TSG RAN; Evolved Universal Terrestrial Radio Access (E-UTRA); Physical layer procedures"

SUMMARY OF INVENTION

Technical Problem

In the case in which the type 0 assignment is used however, the number of RBs assigned to a terminal is restricted to the number of RBs which is a multiple of P (RB). In the same manner as the LTE uplink, furthermore, the number of RBs which cannot be represented by "$2^n \times 3^m \times 5^l$" is actually the number of RBs assigned to a transmission "$2^n \times 3^m \times 5^l$" is band when only the number of RBs which can be represented by applied to be the number of RBs which can be assigned to the transmission band also in the LTE-A uplink.

FIG. 3 shows an example of the case of P=4 in a type 0 assignment. In a multiple of P (RB) shown in FIG. 3, the number of RBs having a circle mark attached thereto indicates the number of RBs which can be represented by "$2^n \times 3^m \times 5^l$", and the number of RBs having a x mark attached thereto indicates the number of RBs which can be represented by "$2^n \times 3^m \times 5^l$". When the number of RBs which can be represented by "$2^n \times 3^m \times 5^l$" is actually set to be the number of RBs which cannot be assigned to the transmission band, thus, the number of RBs which cannot be assigned is increased so that it is hard to carry out a flexible resource assignment. Therefore, a frequency scheduling effect is deteriorated.

On the other hand, even if the number of RBs which cannot be represented by "$2^n \times 3^m \times 5^l$", a circle scale of a DFT circuit is increased when the number of RBs which can be assigned is set.

It is therefore an object of the invention to provide a radio communication apparatus and a radio communication method which can carry out flexible frequency scheduling without increasing a DFT circuit scale.

Solution to Problem

A radio communication apparatus according to the invention employs a structure including receiving section for receiving resource assignment information indicating whether or not a resource is assigned for each group obtained by dividing a system band into a plurality of parts, a setting section that sets a number of resource blocks to assign and use in an actual transmission band corresponding to a number of resource blocks notified through the resource assignment information into a number of resource blocks which can be represented by any of "$2^n \times 3^m \times 5^l$" (n, m and l are integers of zero or more) if the notified number of resource blocks cannot be represented by "$2^n \times 3^m \times 5^l$", and a selecting section that selects resource blocks to assign and use in the actual transmission band from the resource assignment information and the number of resource blocks to assign.

A radio communication apparatus according to the invention employs a structure including a scheduling section that sets a number of resource blocks to assign as actual resources into a number of resource blocks which can be represented by any of "$2^n \times 3^m \times 5^l$" (n, m and l are integers of zero or more) and determining whether or not to assign resources, and a transmitting section that transmits, as resource assignment information, information about any of groups obtained by dividing a system band into a plurality of parts which corresponds to the actual resources.

A radio communication method according to the invention receives resource assignment information indicating whether or not a resource is assigned for each group obtained by dividing a system band into a plurality of parts, sets a number of resource blocks to assign and use in an actual transmission band corresponding to a number of resource blocks notified through the resource assignment information into a number of resource blocks which can be represented by any of "$2^n \times 3^m \times 5^l$" (n, m and l are integers of zero or more) if the notified number of resource blocks cannot be represented by "$2^n \times 3^m \times 5^l$", and selects resource blocks to assign and use in the actual transmission band from the resource assignment information and the number of resource blocks to assign.

Advantageous Effects of Invention

According to the invention, it is possible to carry out flexible frequency scheduling without increasing a DFT circuit scale.

BRIEF DESCRIPTION OF THE DRAWINGS

FIG. 3 is a diagram for explaining the number of RBs which cannot be assigned in the case in which a DFT circuit is used;

FIG. 6 is a diagram showing [Correspondence Example #1-1" of the notified number of RBs and the number of assigned RBs;

FIG. 7 is a diagram showing [Correspondence Example #1-2" of the notified number of RBs and the number of assigned RBs;

FIG. 8 is a diagram showing [Correspondence Example #1-3" of the notified number of RBs and the number of assigned RBs;

FIG. 9 is a diagram showing [Correspondence Example #1-4" of the notified number of RBs and the number of assigned. RBs;

FIG. 10 is a diagram showing [Correspondence Example #2" of the notified number of RBs and the number of assigned RBs;

DESCRIPTION OF EMBODIMENTS

An embodiment according to the invention will be described below in detail with reference to the drawings.

Embodiment

Figure 1:
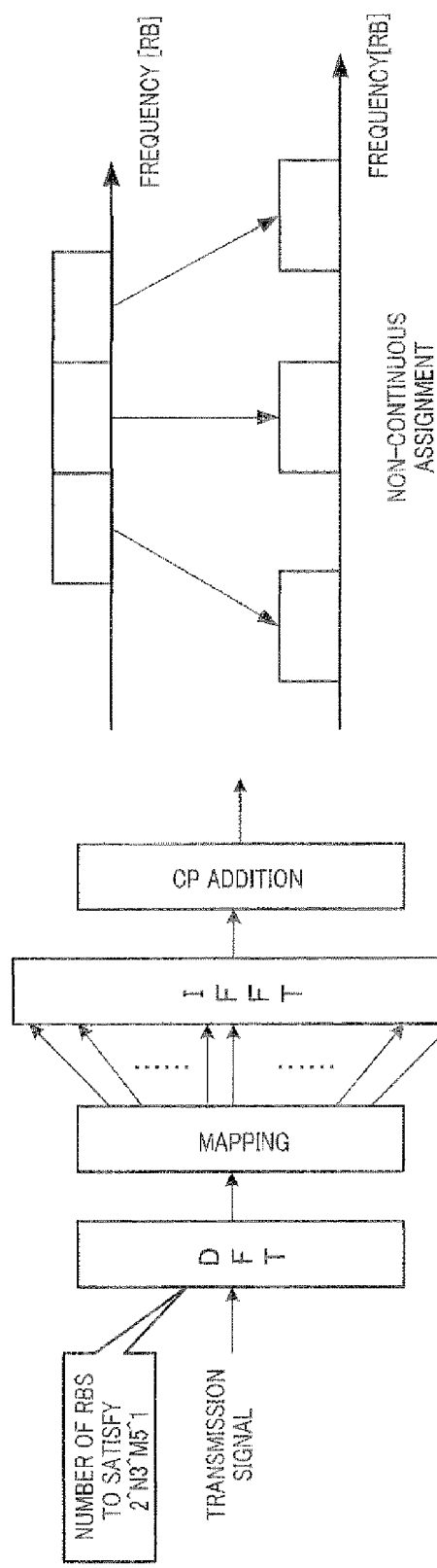
FIG. 1 is a diagram for explaining a non-continuous band assignment of a data signal in an LTE-A uplink.
Figure 2:
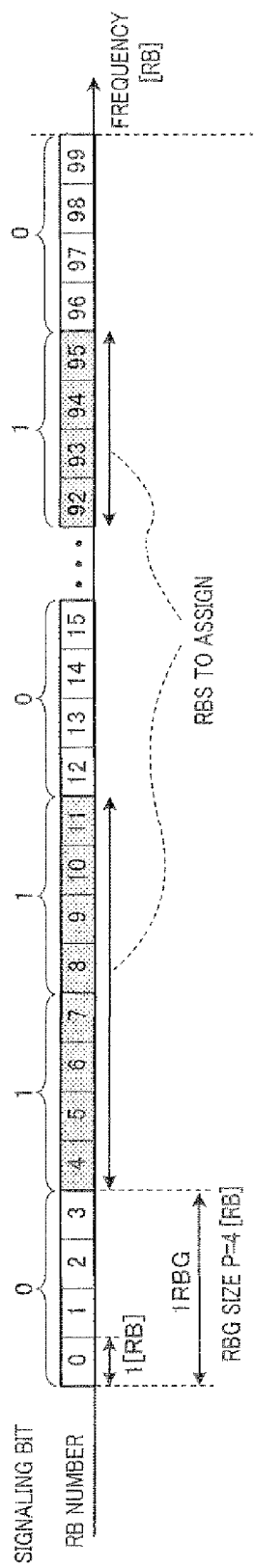
FIG. 2 is a diagram for explaining a type 0 assignment in an LTE-A down link.
Figure 4:
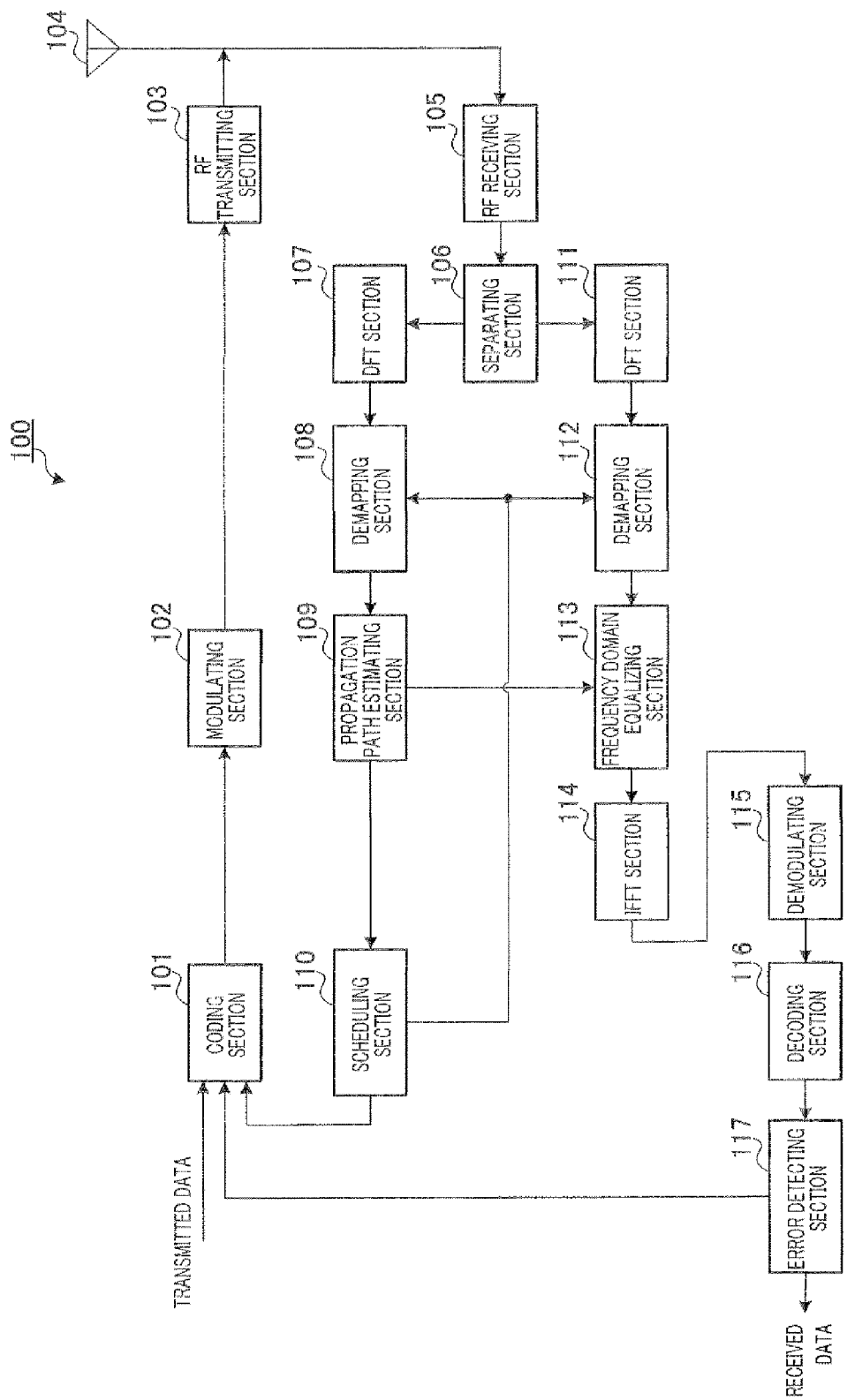
FIG. 4 is a block diagram showing a structure of a base station according to Embodiment 1 of the invention.

A structure of a base station device (hereinafter referred to as a "base station") 100 according to the embodiment of the invention will be described with reference to FIG. 4.

Coding section 101 inputs control information such as transmitted data (down link data), a response signal (an ACK (Acknowledgement) signal or an NACK (Negative Acknowledgment) signal) input from error detecting section 117, resource assignment information of each terminal input from scheduling section 110 and MCS (Modulation Coding Schemes), and codes the input data and outputs the coded data to modulating section 102.

Modulating section 102 modulates the coded data and outputs a modulating signal to RF transmitting (Radio Frequency) section 103.

RF transmitting section 103 carries out a transmission processing such as a D/A (Digital to Analog) conversion, an up-conversion or an amplification over the modulating signal, and transmits the signal subjected to the transmission processing from antenna 104 to each terminal by wireless.

RF receiving section 105 carries out a receipt processing such as a down-conversion or an AD (Analog to Digital) conversion over the signal received through antenna 104, and outputs the signal subjected to the receipt processing to separating section 106.

Separating section 106 separates the signal input from RF receiving section 105 into a pilot signal, a data signal and a control signal. Separating section 106 outputs the separated pilot signal to DFT (Discrete Fourier Transform) section 107 and outputs a data signal and a control signal to DFT section 111.

DFT section 107 carries out a DFT processing over the pilot signal input from separating section 106, converts the pilot signal into a signal in a time domain to a signal in a frequency domain, and outputs the pilot signal converted into the frequency domain to demapping section 108. DFT section 107 may be replaced with an FFT section that carries out an FFT (Fast Fourier Transform) processing.

Demapping section 108 extracts a pilot signal in a corresponding portion to a transmission band of each terminal from the pilot signal in the frequency domain input from DFT section 107. Demapping section 108 outputs the extracted pilot signal to propagation path estimating section 109.

Propagation path estimating section 109 estimates an estimated value of a frequency fluctuation of a channel (a frequency response of a channel) and an estimated value of receipt quality based on the pilot signal input from demapping section 108. Propagation path estimating section 109 outputs the estimated value of the frequency fluctuation of the channel to frequency domain equalizing section 113, and outputs the estimated value of the receipt quality to scheduling section 110.

Scheduling section 110 assigns a resource block (RB) to each terminal by using the estimated value of the receipt quality which is input from propagation path estimating section 109. The resource block assigned to each terminal, that is, a resource block to be used in an actual transmission band by each terminal will be hereinafter referred to as an "assigned resource block (assigned RB)." Scheduling section 110 sets the RBs to assign in such a manner that the number of the RBs to assign can be represented by "$2^n \times 3^m \times 5^l$" (n, m and l are integers which are equal to or greater than zero). Consequently, each terminal can reduce a DFT circuit scale because a DFT processing having the number of inputs of "$2^n \times 3^m \times 5^l$" can be carried out. A method of setting the RBs to assign in scheduling section 110 will be described below. Scheduling section 110 outputs information about the RBs to assign of each terminal to demapping section 108 and demapping section 112.

Moreover, scheduling section 110 generates control information including resource assignment information indicative of information about the RBs to assign, and outputs the generated control information to coding section 101. For example, scheduling section 110 generates, as the resource assignment information, a bit map in which a signaling bit (1 or 0) indicating whether the RBG is assigned to a transmission band is put in the RBG containing the RBs to assign. A resource block notified based on the resource assignment information and assigned as the transmission band will be hereinafter referred to as a "notice resource block (notice RB)." A method of setting the notice RB in scheduling section 110 will be described below. Scheduling section 110 outputs the generated resource assignment information to coding section 101.

DFT section 111 carries out a DFT processing over a data signal input from separating section 106 and converts a signal in a time domain into a signal in a frequency domain. Then, DFT section 111 outputs the data signal converted into the frequency domain to demapping section 112. DFT section 111 may be replaced with an FFT (Fast Fourier Transform) section that carries out an FFT processing.

Demapping section 112 extracts a data signal in a corresponding portion to a transmission band of each terminal from a signal input from DFT section 111. Then, demapping section 112 outputs the extracted signal to frequency domain equalizing section 113.

Frequency domain equalizing section 113 uses the estimated value of the frequency fluctuation of the channel input from propagation path estimating section 109 to carry out an equalization processing over a data signal and a control signal which are input from demapping section 112 and to output the signals subjected to the equalization processing to IFFT (Inverse Fast Fourier Transform) section 114.

IFFT section 114 carries out an IFFT processing over the data signal input from frequency domain equalizing section 113 and outputs the signal subjected to the IFFT processing to demodulating section 115. IFFT section 114 may be replaced with IDFT section that carries out an IDFT (Inverse Discrete Fourier Transform) processing.

Demodulating section 115 carries out a demodulation processing over the signal input from IFFT section 114 and outputs the signal subjected to the demodulation processing to decoding section 116.

Demodulating section 116 carries out a demodulation processing over a signal input from demodulating section 115 and outputs the signal subjected to the decode processing (a decoding bit string) to error detecting section 117.

Error detecting section 117 carries out an error detection over the decoding bit string input from decoding section 116 by using CRC (Cyclic Redundancy Check), for example. As a result of the error detection, error detecting section 117 generates an NACK signal as a response signal if a decoding bit has an error, and generates an ACK signal as the response signal if the decoding bit has no error, and outputs the generated response signal to coding section 101. Moreover, error detecting section 117 outputs a data signal as received data if the decoding bit has no error. Furthermore, error detecting section 117 outputs information about MCS contained in a control signal to coding section 101.

Figure 5:
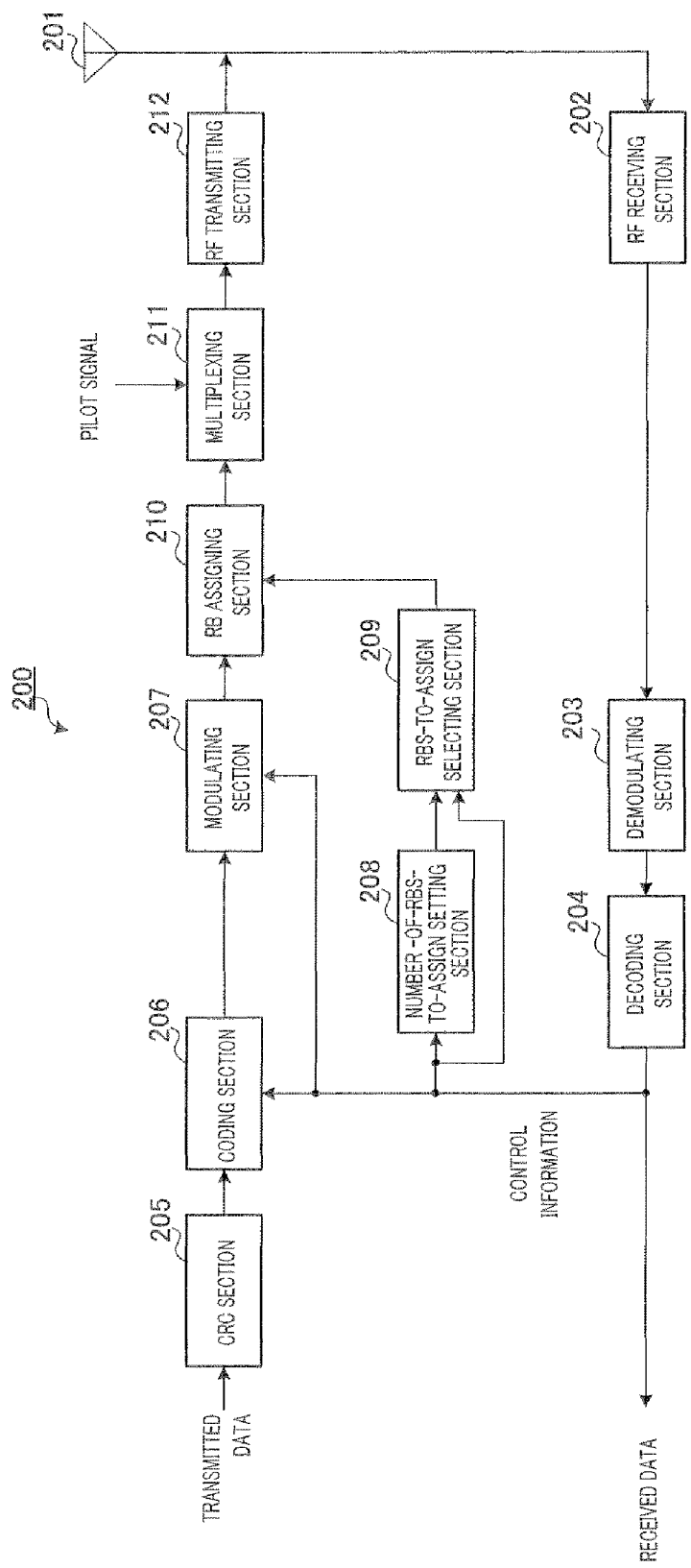
FIG. 5 is a block diagram showing a structure of a terminal according to the embodiment.

Next, a structure of a terminal 200 according to the embodiment of the invention will be described with reference to FIG. 5.

RF receiving section 202 carries out a receipt processing such as a down-conversion or an A/D conversion to a signal received from a base station through antenna 201, and outputs the signal subjected to the receipt processing to demodulating section 203.

Demodulating section 203 carries out an equalization processing and a demodulation processing over the signal input from RE receiving section 202, and outputs the signal subjected to these processings to decoding section 204.

Decoding section 204 carries out the decoding processing over the signal input from demodulating section 203 and extracts received data and control information. The control information includes the response signal (the ACK signal or the NACK signal), the resource assignment information, the MCS information and the like. Decoding section 204 outputs the resource assignment information in the extracted control information to number-of-RBs-to-assign setting section 208 and RBs-to-assign selecting section 209, and outputs the MCS information and the like to coding section 206 and modulating section 207.

CRC section 205 inputs the transmitted data and carries out CRC coding over the transmitted data to generate CRC coded data, and outputs the generated CRC coded data to coding section 206.

Coding section 206 codes CRC coded data input from CRC section 205 based on the control information input from decoding section 204, and outputs the decoded data thus obtained to modulating section 207.

Modulating section 207 modulates coded data input from coding section 206 based on the control information input from decoding section 204, and outputs the modulated data signal to the RB assigning section 210.

Number-of-RBs-to-assign setting section 208 sets the number of RBs to be actually used in a transmission band (hereinafter referred to as the "number of RBs to be assigned") based on the resource assignment information input from decoding section 204. If the number of RBs (the notified number of RBs) indicated by resource assignment information can be represented by "$2^n \times 3^m \times 5^l$", the number of RBs is set to be the number of RBs to assign. If the number of RBs (the notified number of RBs) indicated by resource assignment information cannot be represented by "$2^n \times 3^m \times 5^l$", the number of RBs is determined based on a defined setting method. The method of setting the number of RBs to assign will be described below. Number-of-RBs-to-assign setting section 208 outputs information about the set number of RBs to assign to RBs-to-assign selecting section 209.

RBs-to-assign selecting section 209 selects the RBs to assign and use in an actual transmission band based on the resource assignment information input from decoding section 204 and the number of RBs to assign input from number-of-RBs-to-assign setting section 208. The number of RBs (the notified number of RBs) which is indicated by resource assignment information can be represented by "$2^n \times 3^m \times 5^l$" is set to be the RBs to assign, and the RBs to assign is determined based on the defined selecting method if the number of RBs (the notified number of RBs) indicated by resource assignment information cannot be represented by "$2^n \times 3^m \times 5^l$". The method of selecting the RBs to assign will be described below. RBs-to-assign selecting section 209 outputs information about the selected RBs to assign ("assignment RB information") to RB assigning section 210.

RB assigning section 210 carries out the DFT processing over the data signal input from modulating section 207 and converts the signal in the time domain to the signal in the frequency domain. In the embodiment, RB assigning section 210 carries out the DFT processing by setting the number of data signal inputs sent from modulating section 207 as "2^n× 3^m×5^l". Based on the RBs to assign information input from RBs-to-assign selecting section 209, then, the signal subjected to the DFT processing is assigned to the RB and the IFFT processing is carried out over the data signal assigned to the RB, and the signal subjected to the IFFT processing is output to multiplexing section 211.

Multiplexing section 211 carries out a time division duplex over the pilot signal and the data signal input from RB assigning section 210, and outputs them to RF transmitting section 212.

RF transmitting section 212 carries out a transmission processing such as a D/A conversion, an up-conversion or an amplification over a multiple signal input from multiplexing section 211, and transmits the signal subjected to the transmission preprocessing from the antenna to the base station by radio.

Next, description will be given to the method of setting the number of RBs to assign in number-of-RBs-to-assign setting section 208 and the method of selecting the RBs to assign in RBs-to-assign selecting section 209.

In the following, for example, description will be given by taking, as an example, resource assignment information to be notified with the use of a signaling bit (1 or 0) indicating whether a resource for carrying out a transmission by a subject station is assigned or not every group obtained by dividing a system band into a plurality of parts as in a type 0 assignment. In the type 0 assignment, it is notified whether the resource is assigned or not on a group (RBG) unit of P continuous RBs. In the type 0 assignment, accordingly, a total number of RBs (hereinafter referred to as "notified number of RBs") included in the RBG having a signaling bit of 1, that is, the RBG assigned to the transmission band is a multiple of P in the bit map. In the case in which the notified number of RBs cannot be represented by "2^n×3^m×5^l", therefore, terminal 200 needs to set the number of RBs to assign and to select the RBs to assign based on the resource assignment information.

First of all, description will be given to the method of setting the number of RBs to assign in number-of-RBs-to-assign setting section 208. In the embodiment, a correspondence table of the notified number of RBs and the number of RBs to assign is shared by base station 100 and terminal 200.

A correspondence example of the notified number of RBs and the number of RBs to assign will be described below.

Number-of-RBs-to-assign setting section 208 sets the number of RBs to assign corresponding to the notified number of RBs to be a number of RBs which can be represented by any of "2^n×3^m×5^l", when the notified number of RBs is not such a number of RBs that can be represented by "2^n× 3^m×5^l".

Correspondence Example #1-1

Number-of-RBs-to-assign setting section 208 sets the number of RBs to assign to be the number of RBs which is the closest to the notified number of RBs and which can be represented by "2^n×3^m×5^l". Consequently, it is possible to carry out an assignment which is close to an assignment of a resolution on a P (RB) unit. Thus, it is possible to enhance a frequency scheduling effect.

FIG. 6 shows a correspondence table of the notified number of RBs and the number of RBs to assign in [Correspondence Example #1-1]. As an example, there will be supposed the case in which a bit map of "11111110000000000000000000000" is notified as resource assignment information when the resource assignment information is to be notified in the type 0 assignment of P=4. In case of P=4, each bit of "1" or "0" in the bit map corresponds to each RBG constituted by four RBs (the following other correspondence examples are also the same). In the case in which the bit map of "11111110000000000000000000000" is notified, accordingly, it is indicated that the notified number of RBs is "28" (=P×7=4×7). However, "28" is not a number of RBs which can be represented by "2^n×3^m×5^l". Therefore, when the bit map of "11111110000000000000000000000" is notified as resource assignment information, for example, "27" which is the closest to "28" in the number of RBs and can be represented by "2^n×3^m×5^l" is set to be the number of RBs to assign in case of the notification in the bit map in [Correspondence Example #1-1].

Correspondence Example #1-2

Number-of-RBs-to-assign setting section 208 sets, as the number of RBs to assign, the smallest number of RBs of the numbers of RBs which are larger than the notified number of RBs and which are represented by "2^n×3^m×5^l". Consequently, a resource assignment processing which will be described below can be carried out comparatively easily. Moreover, a bandwidth of each cluster can be increased. Therefore, it is possible to improve accuracy of channel estimation. The cluster is a continuous band constituted by continuous RBGs.

FIG. 7 shows a correspondence table of the notified number of RBs and the number of RBs to assign in [Correspondence Example #1-2]. In the case in which the bit map of "11111110000000000000000000000" is notified as resource assignment information, for example, it is indicated that the notified number of RBs is "28." However, "28" is not a number of RBs which cannot be represented by "2^n×3^m× 5^l". In the case in which the bit map of "11111110000000000000000000000" is notified as resource assignment information, therefore, the smallest "30" in the number of RBs which is larger than "28" and which can be represented by "2^n×3^m×5^l" is set to be the number of RBs to assign in case of the notification in the bit map in [Correspondence Example #1-2].

Correspondence Example #1-3

Number-of-RBs-to-assign setting section 208 sets, as the number of RBs to assign, a maximum one of the numbers of RBs which are smaller than the notified number of RBs and which are represented by "2"n×3^m×51". Consequently, a resource assignment processing which will be described below can be carried out comparatively easily. In the type 0 assignment, if the same RBG is not assigned to a plurality of terminals, the same RBs are not used between terminals. Therefore, frequency scheduling can easily be carried out.

FIG. 8 shows a correspondence table of the notified number of RBs and the number of RBs to assign in [Correspondence Example #1-3]. In the case in which the hit map of "11111110000000000000000000000" is notified as resource assignment information, for example, it is indicated that the notified number of RBs is "28." However, "28" is not a number of RBs which can be represented by "$2^n \times 3^m \times 5^l$". In the case in which the bit map of "1111111000000000000000000000" is notified as resource assignment information, therefore, the largest "27" in the number of RBs which is smaller than "28" and which can be represented by "$2^n \times 3^m \times 5^l$" is set to be the number of RBs to assign in case of notification in the bit map in [Correspondence Example #1-3].

Correspondence Example #1-4

Number-of-RBs-to-assign setting section 208 switches [Correspondence Example #1-2] and [Correspondence Example #1-3] depending on the notified number of RBs or signaling.

FIG. 9 shows a correspondence table of the notified number of RBs and the number of RBs to assign in the case in which [Correspondence Example #1-2] and [Correspondence Example #1-3] are switched corresponding to the notified number of RBs. In [Correspondence Example #1-4] shown in FIG. 9, in the case in which the notified numbers of RBs of "28," "44," "68," "88," "92," "104," "112" and "116" are notified as resource assignment information, number-of-RBs-to-assign setting section 208 sets, as the number of RBs to assign, a minimum number of RBs of the numbers of RBs which are larger than the notified number of RBs and which are represented by "$2^n \times 3^m \times 5^l$" in accordance with [Correspondence Example #1-2]. In the case in which the notified number of RBs of "52," "56," "76" and "84" are notified as resource assignment information, moreover, number-of-RBs-to-assign setting section 208 sets, as the number of RBs to assign, a maximum number of RBs of the numbers of RBs which are smaller than the notified number of RBs and which are represented by "$2^n \times 3^m \times 5^l$" in accordance with [Correspondence Example #1-3]. In [Correspondence Example #1-4] of FIG. 9, consequently, it is possible to further select "50" and "81" in addition to the number of RBs which can be selected as the number of RBs to assign in [Correspondence Example #1-2] of FIG. 7. By switching [Correspondence Example #1-2] and [Correspondence Example #1-3] depending on the notified number of RBs, thus, it is possible to increase the numbers of RBs which can be selected as the number of RBs to assign. Therefore, it is possible to improve flexibility of resource assignment. For example, setting may be carried out to switch FIGS. 7 and 8 in order to decrease a probability for obtaining a number of RBs to assign which is equal to last and subsequent numbers of RBs to assign.

Moreover, number-of-RBs-to-assign setting section 208 switches [Correspondence Example #1-2] and [Correspondence Example #1-3] depending on signaling for a switch command signal contained in the control information notified from base station 100 (for example, one bit indicative of [Correspondence Example #1-2] of FIG. 7 or [Correspondence Example #1-3] of FIG. 8), for instance.

Correspondence Example #2

In [Correspondence Example #1-1] to [Correspondence Example #1-4], in the case in which the notified number of RBs is not a number of RBs which can be represented by "$2^n \times 3^m \times 5^l$", the number of RBs to assign is set to be the number of RBs which is comparatively close to the notified number of RBs. On the other hand, in the case in which the notified number of RBs corresponding to the bit map is not a number of RBs which can be represented by "$2^n \times 3^m \times 5^l$" in [Correspondence Example #2], the bit map corresponds to the number of RBs which can be represented by another "$2^n \times 3^m \times 5^l$".

FIG. 10 shows a correspondence table of the notified number of RBs and the number of RBs to assign in [Correspondence Example #2]. In the case in which the resource assignment information is notified in the type 0 assignment, it is indicated that the notified number of RBs is "28" if the bit map of "1111111000000000000000000000" is notified as resource assignment information, for example. However, "28" is not a number of RBs which can be represented by "$2^n \times 3^m \times 5^l$". Therefore, in the case in which the bit map of "1111111000000000000000000000" is notified as resource assignment information, for example, number-of-RBs-to-assign setting section 208 sets the number of RBs to assign in case of the notification in the bit map into "2" in the number of RBs which can be represented by "$2^n \times 3^m \times 5^l$" in [Correspondence Example #2].

FIG. 10 shows an example in which the number of RBs that can be represented by "$2^n \times 3^m \times 5^l$" corresponds to the notified number of RBs that cannot be represented by "$2^n \times 3^m \times 5^l$" in ascending order if 1 RBG is constituted by 4 RBs in case of the type 0 assignment. In case of a multiple of P (RB) in the number of RBs which can be represented by "$2^n \times 3^m \times 5^l$", however, it is preferable that the notified number of RBs should be exactly set to the number of RBs to assign. Therefore, FIG. 10 shows an example in which the number of RBs excluding multiples of four in the number of RBs that can be represented by "$2^n \times 3^m \times 5^l$" correspond to the notified number of RBs that cannot be represented by "$2^n \times 3^m \times 51$" in ascending order.

The method of setting the number of RBs to assign in number-of-RBs-to-assign setting section 208 has been described above.

Next, the method of selecting the RBs to assign in RBs-to-assign selecting section 209 will be described.

RBs-to-assign selecting section 209 selects RB (assignment RB) to be used in an actual transmission band corresponding to the notified. RB and the number of RBs to assign. More specifically, in the case in which the notified number of RBs is greater than the number of RBs to assign, RBs-to-assign selecting section 209 selects assigned RB from notified RB. Alternatively, RBs-to-assign selecting section 209 selects RB which is not used in an actual transmission band (RB which is not utilized) from the notified RB, and sets RB other than RB which is not utilized in the notified RB as the RBs to assign. In the case in which the notified number of RBs is smaller than the number of RBs to assign, RBs-to-assign selecting section 209 sets the notified RB to be the RBs to assign, and furthermore, selects RB (added RB) to be added as the RBs to assign.

If the method of selecting the RBs to assign (the added RB or the non-utilized RB) is determined between RBs-to-assign selecting section 209 of terminal 200 and scheduling section 110 of base station 100, terminal 200 can easily grasp the RBs to assign which is assigned by scheduling section 110 based on the notified RB and the number of RBs to assign.

Selection Example #1

RBs-to-assign selecting section 209 selects RBs corresponding to the number of RBs to assign as the RBs to assign in order from RBs at a low frequency side (or a high frequency side) in the notified RBs. In other words, RBs-to-assign selecting section 209 selects RBs corresponding to (the notified number of RBs−the number of RBs to assign) as non-utilized RBs in order from RBs at a high frequency side (or a low frequency side) in the notified RBs.

Figure 11A:
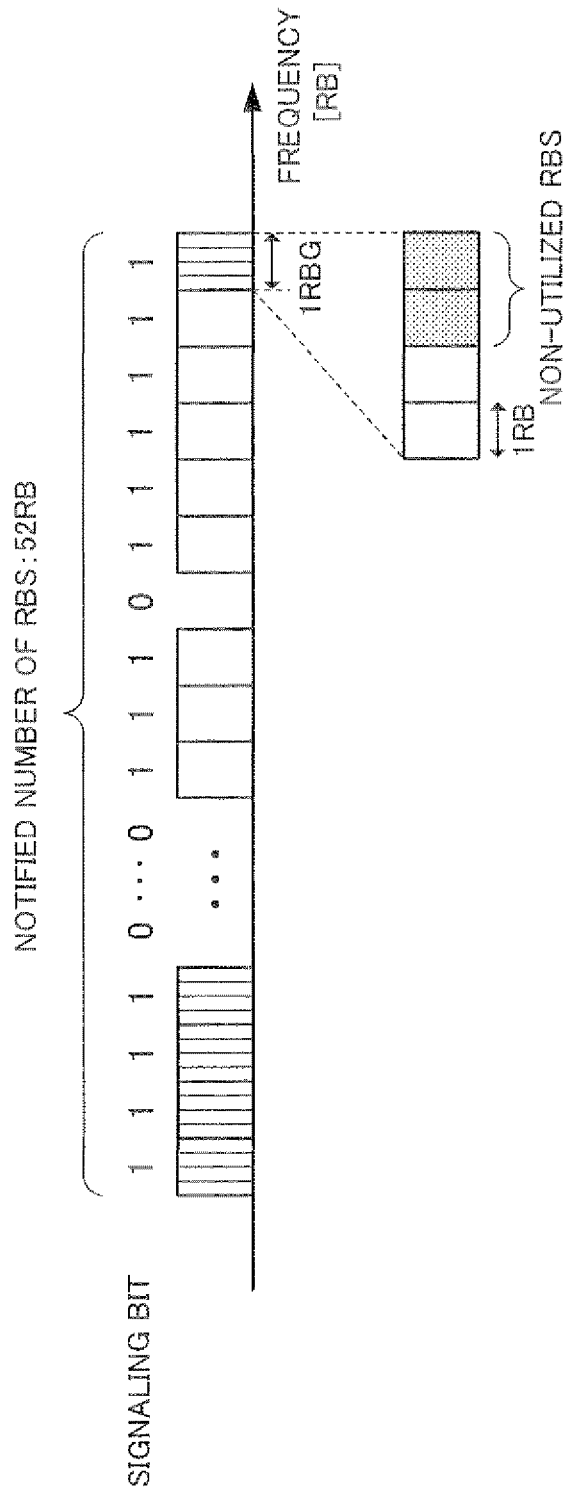
FIG. 11A is a diagram showing "selection example #1" of an assignment RB.

FIG. 11A shows an example of the case in which the notified number of RBs is "52" and the number of RBs to assign is set to be "50" as in [Correspondence Example #1-1] or [Correspondence Example #1-3]." In the example shown in FIG. 11A, RBs-to-assign selecting section 209 selects 2 (52−50) non-utilized RBs in order from the RBs at the high frequency side of the notified RBs.

Figure 11B:
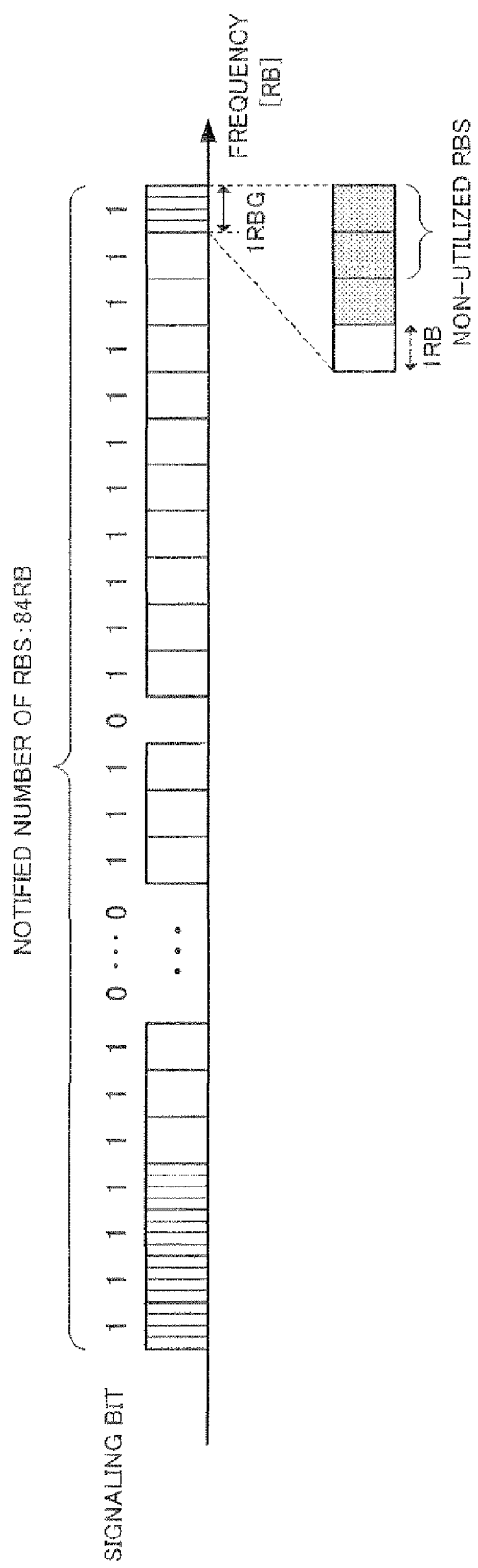
FIG. 11B is a diagram showing another example of "selection example #1" of the RBs to assign.

FIG. 11B shows an example of the case in which the notified number of RBs is "84" and the number of RBs to assign is set to be "81" as in [Correspondence Example #1-1] or [Correspondence Example #1-3]. In the example shown in FIG. 11B, RBs-to-assign selecting section 209 selects 3 (84−81) non-utilized RBs in order from the RBs at the high frequency side of the notified RBs.

Figure 11C:
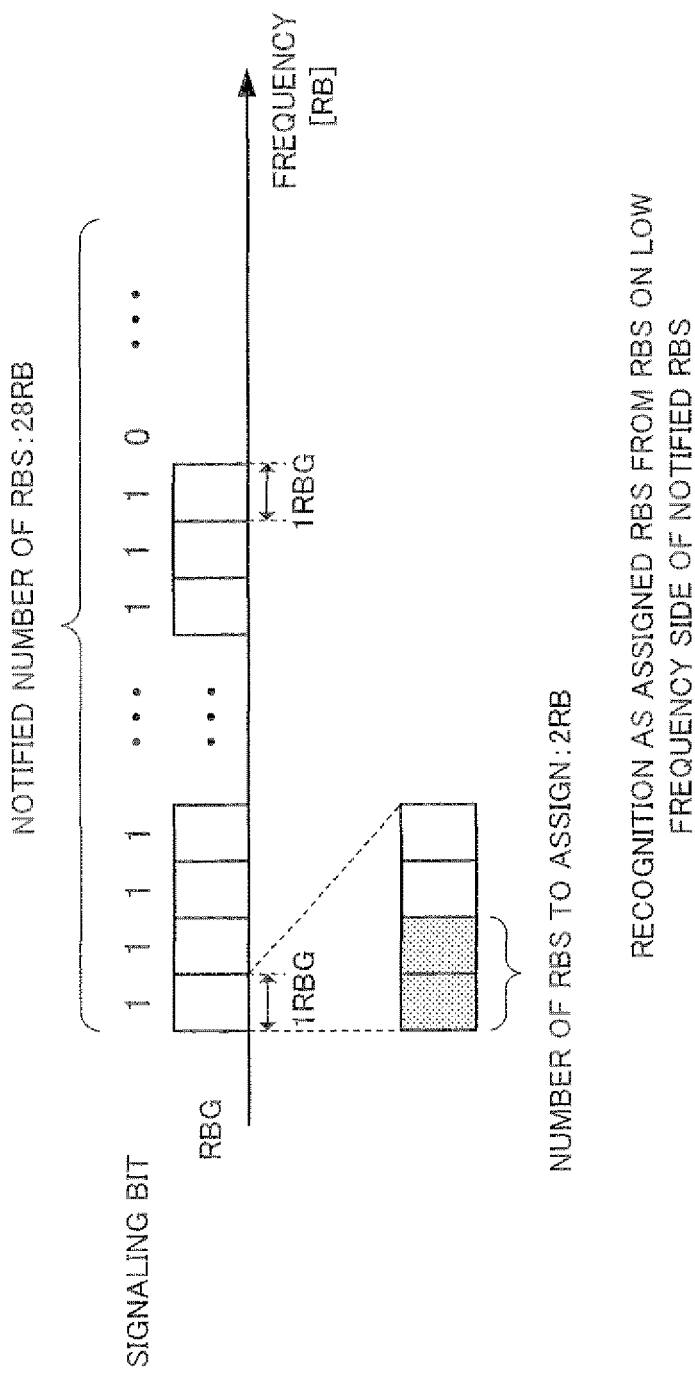
FIG. 11C is a diagram showing a further example of "selection example #1" of the RBs to assign.

FIG. 11C shows an example of the case in which the notified number of RBs is "28" and the number of RBs to assign is set to be "2" as in [Correspondence Example #2]. In the example shown in FIG. 11C, RBs-to-assign selecting section 209 selects two assigned RBs in order from the RBs at the low frequency side of the notified RBs.

By selecting RBs to assign corresponding to the number of RBs to assign from an end of the notified RB in order from the RBs on the low frequency side (or the high frequency side), thus, it is possible to continuously ensure the RBs which are not used in the transmission band on the end at the high frequency side (or the low frequency side). Therefore, terminals in other stations having great transmission bandwidths can easily be arranged.

RBs-to-assign selecting section 209 may select the non-utilized RB from both the RB on the high frequency side and the RB on the low frequency side in the notified RBs, and may set the RBs corresponding to (the notified number of RBs−the number of RBs to assign) as non-utilized RBs.

Selection Example #2

In [Selection Example #1], the RBs-to-assign selecting section 209 selects the RBs corresponding to the number of RBs to assign as the RBs to assign in order from the RB on the low frequency side (or the high frequency side) in the notified RBs. In [Selection Example #2], in the case in which the notified RB is constituted by a plurality of clusters, RBs-to-assign selecting section 209 selects the RBs to assign in order from the RBs on the low frequency side of each of the clusters.

Figure 12:
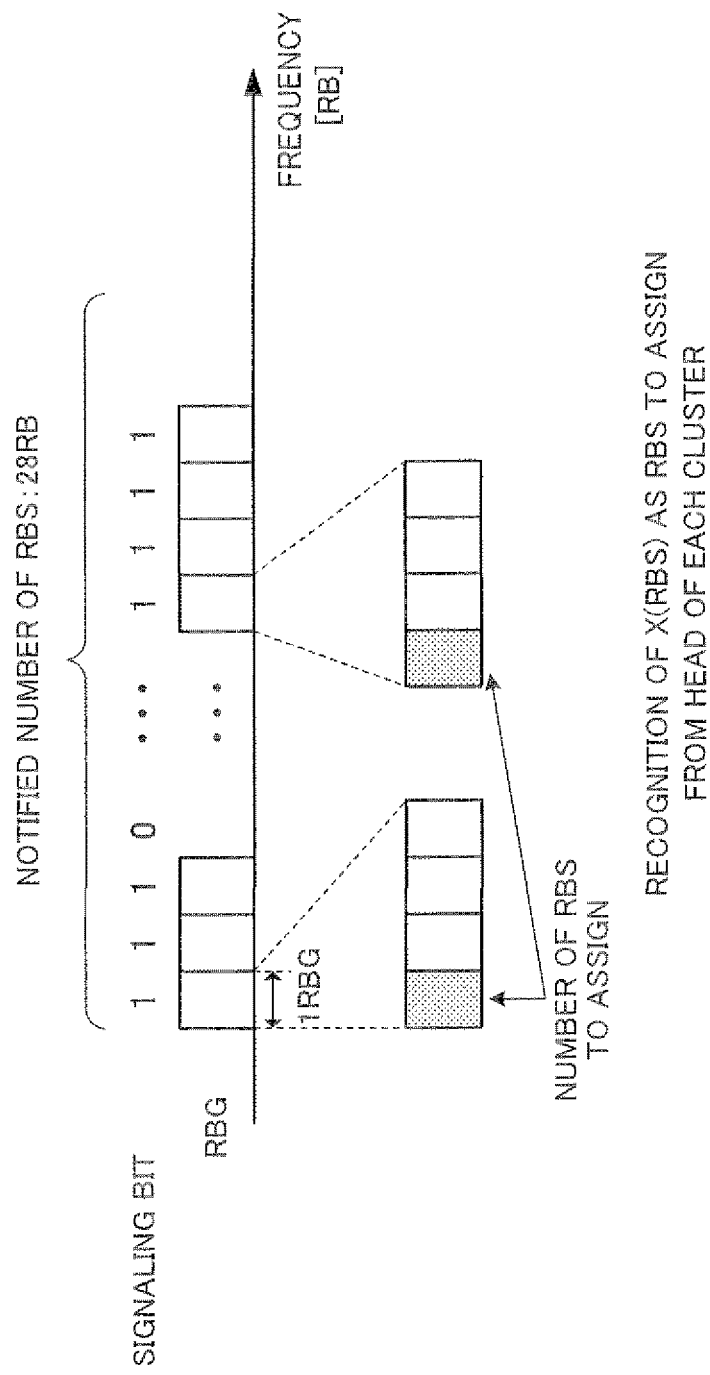
FIG. 12 is a diagram showing "selection example #2" of the RBs to assign.

FIG. 12 shows an example of the ease in which the notified number of RBs is "28" and the number of RBs to assign is set to be "2" as in [Correspondence Example #2]. In the example shown in FIG. 12, RBs-to-assign selecting section 209 selects two RBs on the lowest frequency side of each of the clusters as the RBs to assign. In the case in which the notified RB is constituted by a plurality of clusters, thus, RBs-to-assign selecting section 209 selects the RBs to assign in order from the RB on the low frequency side of each of the clusters. Consequently, the RBs to assign can be arranged non-continuously. Therefore, it is possible to enhance a frequency diversity effect.

Selection Example #3

In the case in which the notified RB is constituted by a plurality of clusters, RBs-to-assign selecting section 209 selects non-utilized RBs continuously from the RB on the end (the low frequency side or the high frequency side) of the clusters.

Figure 13A:
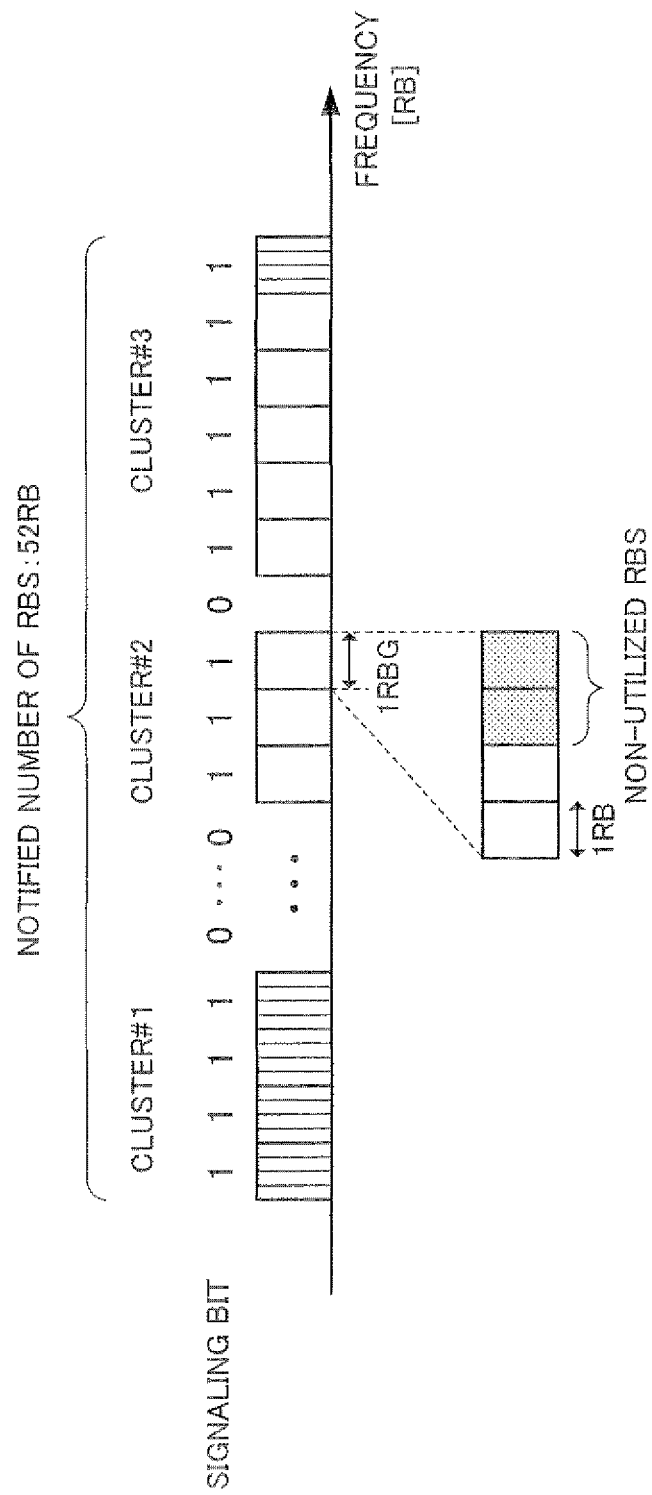
FIG. 13A is a diagram showing "selection example #3" of the RBs to assign.

FIG. 13A shows an example of the case in which the notified number of RBs is "52" and the number of RBs to assign is set to be "50" as in [Correspondence Example #1-1] or [Correspondence Example #1-3]. FIG. 13A shows an example in which the notified RB is constituted by three clusters #1, #2 and #3, and RBs-to-assign selecting section 209 selects the non-utilized RB from the end on the high frequency side of the cluster #2. Consequently, two RBs are maintained continuously on the end at the high frequency side of the cluster #2 as the non-utilized RB.

Figure 13B:
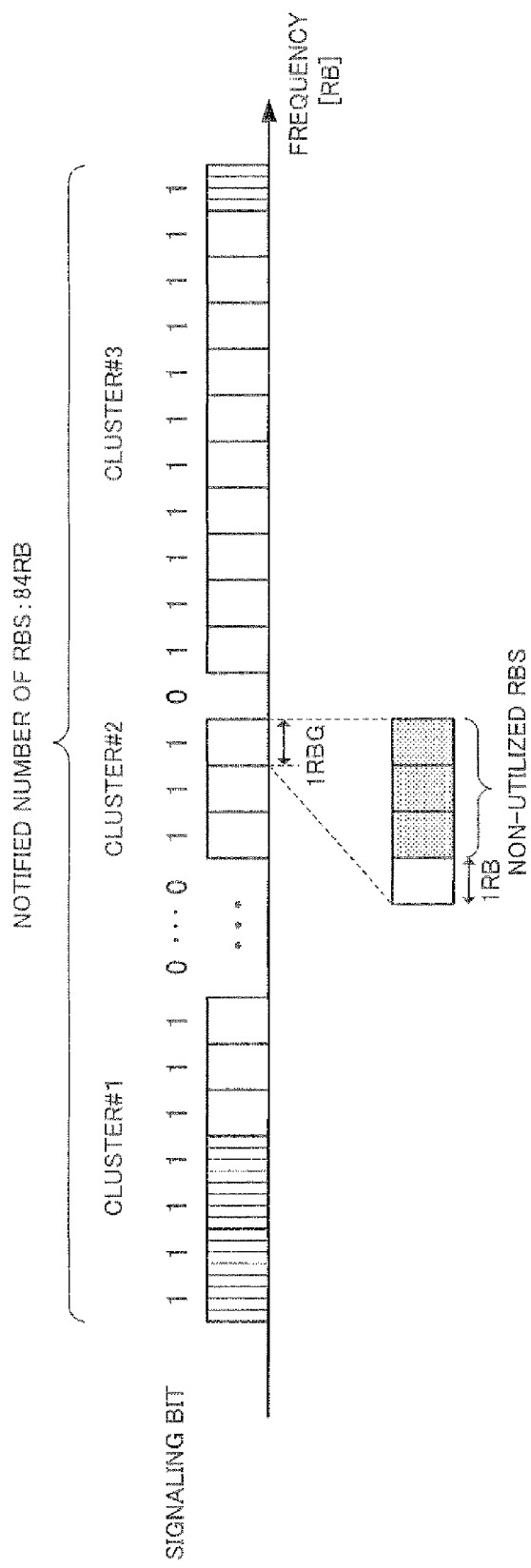
FIG. 13B is a diagram showing another example of "selection example #3" of the RBs to assign.

Moreover, FIG. 13B shows an example of the case in which the notified number of RBs is "84" and the number of RBs to assign is set to be "81" as in [Correspondence Example #1-1] or [Correspondence Example #1-3]. FIG. 13B also shows an example in which the notified RB is constituted by three clusters #1, #2 and #3, and RBs-to-assign selecting section 209 selects the non-utilized RB from the high frequency side of the cluster #2. Consequently, three RBs are maintained continuously on the high frequency side of the cluster #2 as the non-utilized RB.

As shown in FIGS. 13A and 13B, in the case in which the non-utilized RB is present, it is continuously maintained on the end of the cluster (the low frequency side or the high frequency side). Consequently, the non-utilized RB can be set to be a continuous band. Therefore, it is possible to easily assign terminals having great transmission bandwidths in the other stations.

Figure 13C:
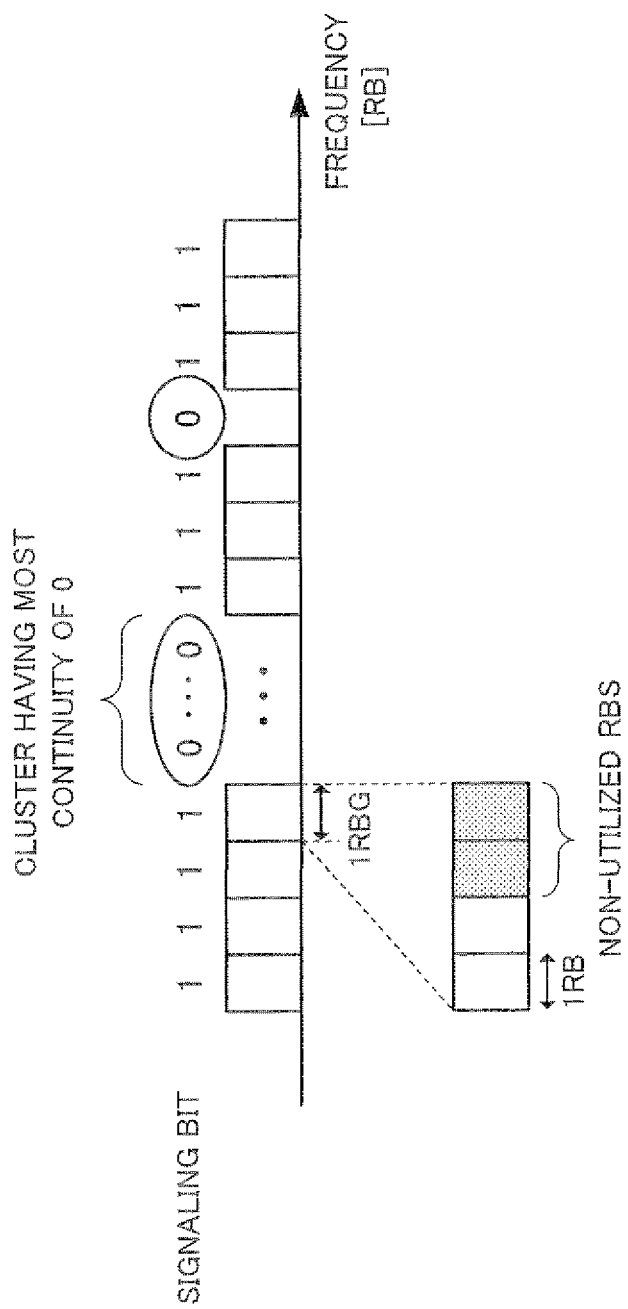
FIG. 13C is a diagram showing a further example of "selection example #3" of the RBs to assign.

As shown in FIG. 13C, moreover, RBs-to-assign selecting section 209 may select the non-utilized RB from any of the clusters that is adjacent to a region in which a signaling bit of 0 (which is not assigned) is the most continuous in a bit map of the type 0 assignment. Consequently, it is possible to increase a non-utilized bandwidth most greatly. Thus, it is possible to easily assign the terminals having great transmission bandwidths in the other stations. The RB contained in any of the clusters which is provided on the low frequency side or the high frequency side may be set to be the RBs to assign, and the non-utilized RB may be prevented from being selected from the clusters on the low frequency side or the high frequency side. Consequently, it is possible to prevent a difference from being made between a system bandwidth and an actual transmission bandwidth.

Figure 13D:
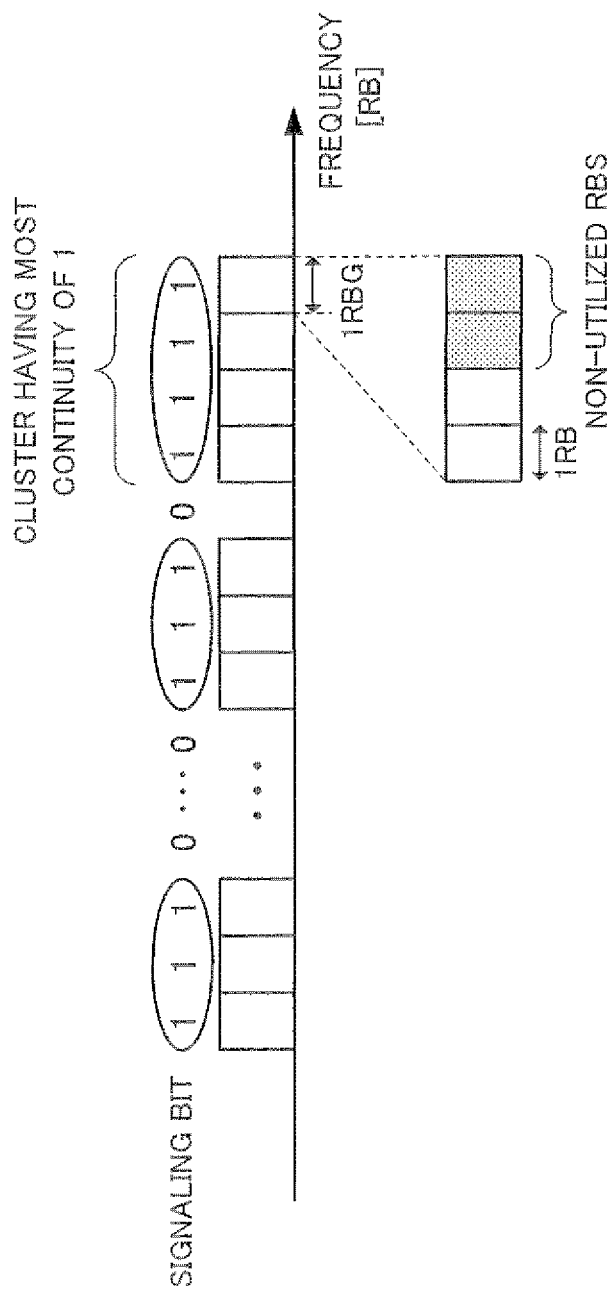
FIG. 13D is a diagram showing a further example of "selection example #3" of the RBs to assign.

As shown in FIG. 13D, moreover, RBs-to-assign selecting section 209 may select the non-utilized RB from any of the clusters in which a signaling bit of 1 (assigned) is the most continuous in the bit map of the type 0 assignment. Consequently, each cluster can ensure a great transmission bandwidth. Therefore, it is possible to suppress deterioration in accuracy of channel estimation. At this time, the non-utilized RB is selected from the end of the cluster in which the signaling bit of 1 (assigned) is the most continuous. Consequently, it is possible to increase the non-utilized bandwidth most greatly. Thus, it is possible to easily assign the terminals having great transmission bandwidths in the other stations.

Selection Example #4

Figure 14:
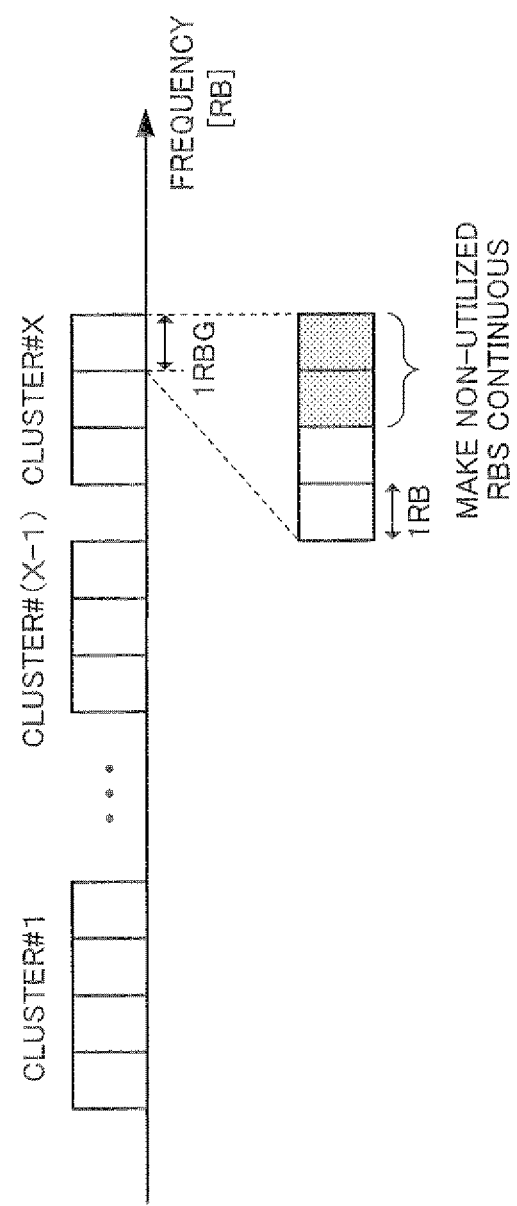
FIG. 14 is a diagram showing "selection example #4" of the RBs to assign.

In the case in which at least two non-utilized RBs are present, RBs-to-assign selecting section 209 sets non-utilized RBs to be continuous RBs. Consequently, the continuous RBs become non-utilized RBs. Therefore, it is possible to easily assign the terminals having great transmission bandwidths in the other stations. FIG. 14 shows an example of [Selection Example #4].

Selection Example #5

In [Selection Example #1] to [Selection Example #4], the description has been given to the method for selecting the RBs to assign in the case in which the number of RBs to assign is smaller than the notified number of RBs. In [Selection Example #5], description will be given to the method of selecting the RBs to assign in the case in which the number of RBs to assign is larger than the notified number of RBs. In the ease in which the number of RBs to assign is larger than the notified number of RBs, RBs-to-assign selecting section 209 selects an RB (an added RB) to be added to the notified RB as the RBs to assign. More specifically, RBs-to-assign selecting section 209 selects, as the added RB, an adjacent RB to an RB to which the signaling bit of 1 (assigned) is notified in the bit map of the type 0 assignment.

Figure 15:
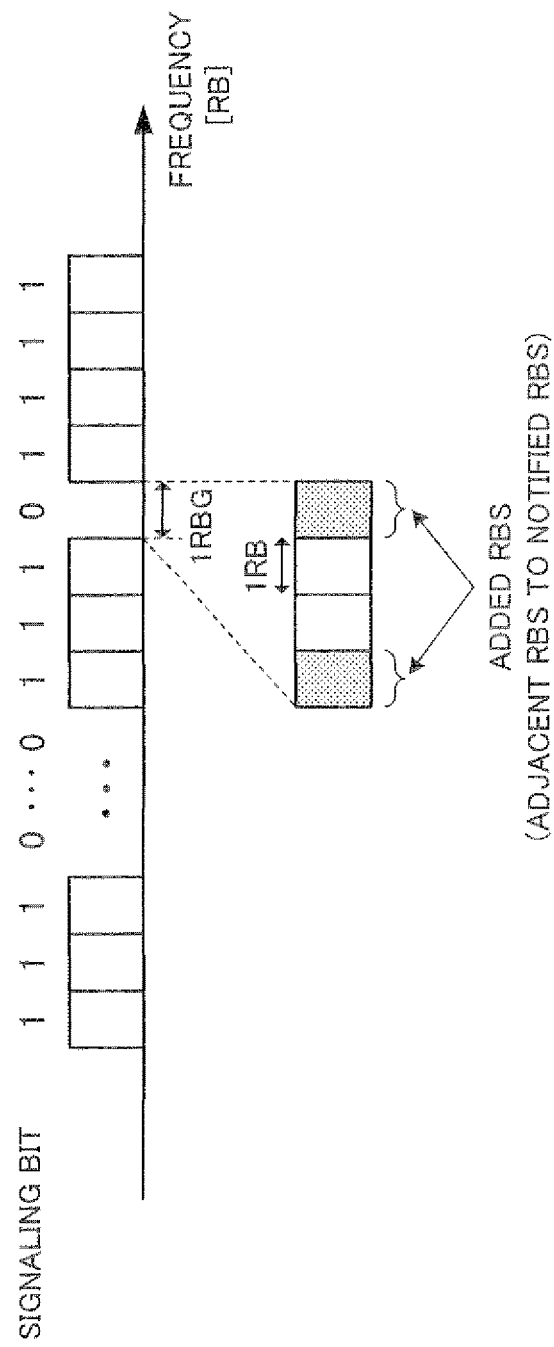
FIG. 15 is a diagram showing "selection example #5" of the RBs to assign.

FIG. 15 shows an example of [Selection Example #5] As shown in FIG. 15, RBs-to-assign selecting section 209 selects, as the added RB, an adjacent RB to an RB to which the signaling bit of 1 (assigned) is notified in the bit map of the type 0 assignment. Consequently, it is possible to assign the continuous RB to the transmission band. Therefore, it is possible to ensure a continuous and broad transmission band. Thus, it is possible to improve accuracy of channel estimation.

The added RB may be assigned to the end of the cluster in which the signaling bit of 1 (assigned) has the smallest bandwidth in the bit map of the type 0 assignment. Consequently, the cluster having a small bandwidth is relieved. Therefore, an averaging processing effect of the pilot signal can be enhanced. Thus, the accuracy of channel estimation can be improved.

Selection Example #6

In [Selection Example #6], description will be given to the method of selecting the RBs to assign in the case in which the number of RBs to assign is equal irrespective of a different notified number of RBs. In a correspondence example of the notified number of RBs and the number of RBs to assign, the number of RBs to assign is equal irrespective of the different notified number of RBs in some cases. For example, in [Correspondence Example #1-3], the number of RBs to assign is equal to "81" in the case in which the notified number of RBs is "84" or "88." In this case, as described in [Selection Example #1], when the non-utilized RB is selected from the RBs of the cluster on the low frequency side, the same RB is selected to be the non-utilized RB also in the case in which the notified number of RBs is "84" or "88." Therefore, it is assumed that the RBs to assign with the same number of RBs to assign is set to be the non-utilized RB and a different RB is thus selected irrespective of the different notified number of RBs. For example, RBs-to-assign selecting section 209 selects the RB on the high frequency side of the cluster as the non-utilized RB if the notified number of RBs is "84," and RBs-to-assign selecting section 209 selects the RB on the low frequency side of the cluster as the non-utilized RB if the notified number of RBs is "88."

Figure 16:
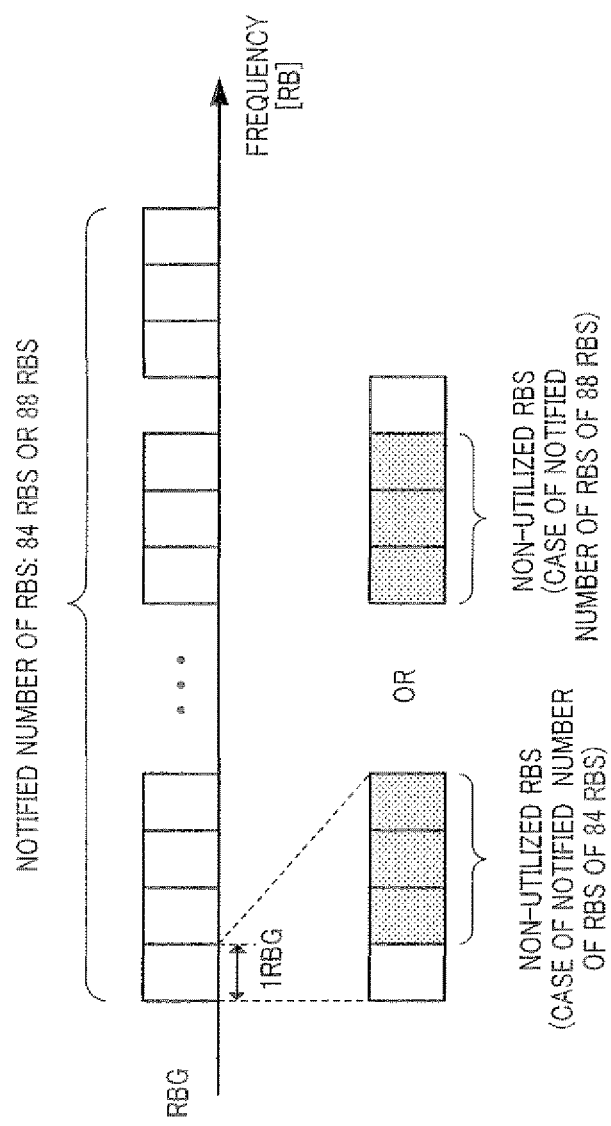
FIG. 16 is a diagram showing "selection example #6" of the RBs to assign.

FIG. 16 shows an example of [Selection Example #6]. In the case in which the notified number of RBs is different, thus, RBs-to-assign selecting section 209 selects the non-utilized RB to be the different RB even if the number of RBs to assign is equal. In the case in which the notified number of RBs is different, consequently, it is possible to set the transmission band into a different RB arrangement. Therefore, it is possible to avoid the notification of the same RB assignment, thereby relieving unnecessary signaling.

Selection Example #7

Figure 17:
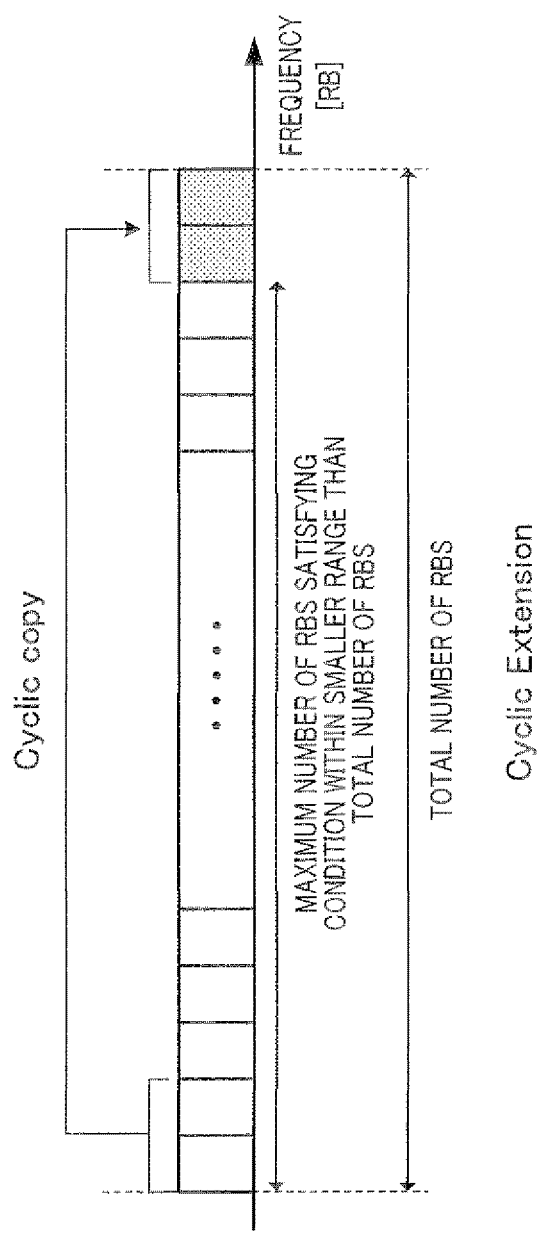
FIG. 17 is a diagram showing "selection example #7" of the RBs to assign.
Figure 18:
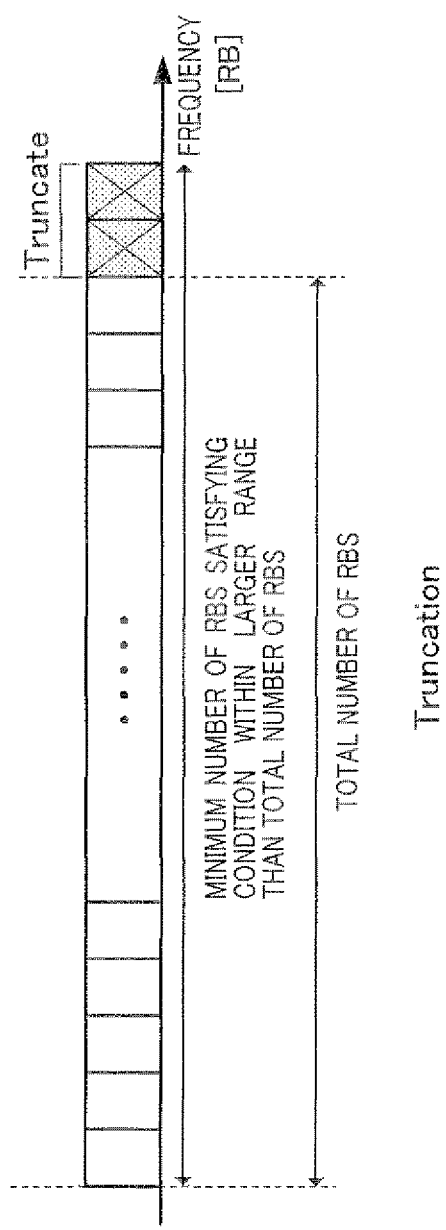
FIG. 18 is a diagram showing another example of "selection example #7" of the RBs to assign.

FIGS. 17 and 18 show an example of [Selection Example #7]. In the case in which a total number of RBs (the notified number of RBs) in the transmission bandwidth which is notified in the resource assignment on the RBG unit is a multiple of P (RB) and is not a number of RBs which can be represented by "$2^n \times 3^m \times 5^l$", a transmission signal corresponding to the number of RBs which can be represented by "$2^n \times 3^m \times 5^l$" is generated and the transmission signal is converted into a transmission signal satisfying the total number of RBs by using cyclic extension (see FIG. 17) or truncation (see FIG. 18) in the frequency domain. For example, in the case in which the total number of RBs is "28," a signal corresponding to the transmission bandwidth 27 RB is generated and is converted into a frequency spectrum in a DFT processing and a first half part of the frequency spectrum is then added to a second half part to obtain a coincidence with 28 RBs. Consequently, the number of RBs which is the multiple of P (RB) and cannot be represented by "$2^n \times 3^m \times 5^l$" can also be subjected to the resource assignment. Therefore, it is possible to improve the frequency scheduling effect.

The method for selecting the RBs to assign in RBs-to-assign selecting section 209 has been described above.

Next, description will be given to the method of setting the RBs to assign and the notified RB in scheduling section 110. As the method for setting the RBs to assign and the notified RB, two methods are employed. Description will be given in order.

[1] Scheduling section 110 sets the RBs to assign of each terminal by using an estimated value of receipt quality which is input from propagation path estimating section 109. At this time, scheduling section 110 assigns a resource on the RBG unit. If the number of RBs cannot be represented by "$2^n \times 3^m \times 5^l$" (n, m and l are integers of zero or more), a part of the RBs in the RBG to which a resource is assigned as a transmission band are set to be non-utilized RBs or a part of the RBs to which the resource is not assigned as the transmission band are set to be utilized RBs in such a manner that the number of RBs to assign can be represented by "$2^n \times 3^m \times 5^l$", (n, m and l are integers of zero or more).

In the case in which the non-utilized RB or the added RB is not present, scheduling section 110 sets an equal number to the number of RBs to assign into the notified number of RBs, and furthermore, generates resource assignment information corresponding to the RBs to assign. On the other hand, in the case in which the non-utilized RB or the added RB is present, scheduling section 110 sets the notified number of RBs from the number of RBs to assign based on the correspondence example of the notified number of RBs and the number of RBs to assign, and furthermore, generates resource assignment information corresponding to the RBs to assign. Also in case of a non-continuous assignment, consequently, it is possible to carry out flexible frequency scheduling without increasing a DFT circuit scale.

There will be supposed the case in which scheduling section 110 sets continuous RBs of a number of RBs to assign of "2" to the RBs to assign based on [Correspondence Example #2] and [Selection Example #1], for example. In this case, scheduling section 110 sets the notified number of RBs to "28" corresponding to the number of RBs to assign of "2" based on [Correspondence Example #2]. Moreover, scheduling section 110 sets the notified RB based on [Selection Example #1]. For example, as shown in FIG. 11C, there is set such notified RB that the RBs to assign is disposed on the RB at the low frequency side of the notified RB in order, and a bit map constituted by a corresponding signaling bit to the set notified RB is generated as resource information.

Moreover, there will be supposed the case in which scheduling section 110 sets the non-continuous RB in the number of RBs to assign of "2" into the RBs to assign based on

[Correspondence Example #2] and [Selection Example #1]. In this case, scheduling section 110 sets the notified number of RBs to "28" corresponding to the number of RBs to assign of "2" based on [Correspondence Example #2]. Moreover, scheduling section 110 sets the notified RB based on [Selection Example #1]. For example, as shown in FIG. 12, there is set such notified RB that the RBs to assign is disposed on the RB at the low frequency side of each of the clusters, and a bit map constituted by a signaling bit corresponding to the notified RB thus set is generated as resource information.

[2] Scheduling section 110 determines the number of RBs to be assigned to each terminal from the number of RBs which can be selected as the number of RBs to assign by using the estimated value of the receipt quality which is input from propagation path estimating section 109.

Then, scheduling section 110 ensures a resource corresponding to the number of RBs to assign on the RBG unit and generates resource assignment information indicative of the ensured RBG. Consequently, a resource block contained in the ensured RBG is notified as the notified RB to each terminal. Scheduling section 110 determines the non-utilized RB or the added RB from the RBGs to be used in the transmission band based on the correspondence example of the notified number of RBs and the number of RBs to assign and the selection example of the RBs to assign. Consequently, scheduling section 110 can be set in such a manner that the number of RBs to assign can be represented by "$2^n \times 3^m \times 5^l$" (n, m and l are integers of zero or more). Also in case of the non-continuous assignment, therefore, it is possible to carry out flexible frequency scheduling without increasing a DFT circuit scale.

There will be supposed the case in which the RBs to assign having a number of RBs to assign of "50" is set when scheduling section 110 is based on [Correspondence Example #1-1] and "selection example #1], for example. In this case, scheduling section 110 sets the notified number of RBs to be "52" corresponding to the number of RBs to assign of "50" based on [Correspondence Example #2]. Moreover, scheduling section 110 ensures the notified RB based on [Selection Example #1]. For example, as shown in FIG. 11A, there is ensured such notified. RB that the RBs to assign is disposed on the RB at the low frequency side of the notified RB in order, and a bit map constituted by a signaling bit corresponding to the notified RB thus ensured is generated as resource information.

Thus, scheduling section 110 sets the number of RBs to assign and use in an actual transmission band corresponding to the notified number of RBs into a number of resource blocks which can be represented by any of "$2^n \times 3^m \times 51$" (n, m and l are integers of zero or more) if the notified number of RBs cannot be represented by "$2^n \times 3^m \times 5^l$", and generates information about RBG corresponding to the RBs to assign as resource assignment information.

As described above, in the embodiment, number-of-RBs-to-assign setting section 208 sets the number of resource blocks to assign corresponding to the notified number of RBs into the resource block number which can be represented by any of "$2^n \times 3^m \times 5^l$" if the notified number of RBs cannot be represented by "$2^n \times 3^m \times 5^l$", and RBs-to-assign selecting section 209 selects the RBs to assign and use in the actual transmission band from the resource assignment information and the number of RBs to assign. Moreover, scheduling section 110 sets the number of RBs to assign and use in the actual transmission band corresponding to the notified number of RBs into the resource block number which can be represented by any of "$2^n \times 3^m \times 5^l$", and generates information about the RBG corresponding to the RBs to assign as the resource assignment information. Consequently, it is possible to carry out flexible frequency scheduling without increasing a DFT circuit scale.

Although the explanation has been given to the case in which the signaling bits (1 or 0) indicating whether or not the resource is assigned on the RBG unit are set in accordance with the type 0 assignment and the bit map constituted by the signaling bits is notified as resource assignment information in the above description, the invention is not restricted thereto but it is also possible to use a format assigned on a P (RB) unit, for example. For example, it is also possible to employ a method for notifying first and last RBGs of an assigned resource to RBG in which a system band is divided on the P (RB) unit or a method for notifying the first RBG of the assigned resource and the RBG number in the bandwidth. Moreover, a group divided into a plurality of parts does not always need to be divided on the P (RB) unit but it is preferable that a base station device and a terminal apparatus should share the number of RBs in which the bit map is contained in a corresponding group.

Although the explanation has been given to the case in which the number of RBs to be input to the DFT circuit is restricted to "$2^n \times 3^m \times 5^l$" in the above description, moreover, the invention can also be applied to the case in which an FFT circuit is used in place of the DFT circuit. In the FFT circuit, the number of RBs to be input to the FFT circuit is restricted to "$2^n$." Therefore, it is preferable that "$2^n \times 3^m \times 5^l$" should be replaced with "$2^n$" to set a correspondence table of the added number of RBs and the number of RBs to assign. The invention is more suitable for the DFT circuit capable of selecting a large number of number of RBs than the FFT circuit having an input signal restricted to the number of RBs of "$2^n$".

In the base station, a resource of another terminal may be assigned to the RB which is not utilized. In the terminal, the RB which is not utilized may be used as a resource for transmitting control information of a subject station or other stations.

Although the presence or absence of assignment of the transmission band is specified for each group into which the system band is divided with the present invention, the invention may be applied to a part of the system band in place of the whole system band. In other words, in the system band of 100 RBs, the invention is not restricted to the case in which the resource assignment information is generated for the 100 RBs but may be applied to the case in which the resource assignment information is generated for 50 RBs.

Although the description has been given on the assumption that each data signal is transmitted from each antenna in the embodiment, the invention can also be applied to the case in which the data signal is transmitted from each antenna port.

The antenna port indicates a theoretical antenna which is constituted by at least one physical antenna. In other words, the antenna port is not always restricted to the single physical antenna but indicates an array antenna constituted by a plurality of antennas or the like in some cases.

For example, in 3GPP LTE, the number of physical antennas to constitute an antenna port is not defined but a base station is defined as a minimum unit capable of transmitting different reference signals.

Moreover, the antenna port is defined as a minimum unit for multiplying the weighting of a preceding vector in some cases.

Also, although cases have been described with the above embodiment as examples where the present invention is configured by hardware, the present invention can also be realized by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-063032, filed on Mar. 16, 2009, including the specification, drawings, and abstract, is incorporated herein by reference in its entirety.

INDUSTRIAL APPLICABILITY

The invention is useful as a radio communication apparatus, a radio communication method and the like in a radio communication system that assigns a data signal to a non-continuous band.

REFERENCE SIGNS LIST

100 Base station
101, 206 Coding section
102, 207 Modulating section
103, 212 RF transmitting section
104, 201 Antenna
105, 202 RF receiving section
106 Separating section
107, 111 DFT section
108, 112 Demapping section
109 Propagation path estimating section
110 Scheduling section
113 Frequency domain equalizing section
114 IFFT section
115, 203 Demodulating section
116, 204 Decoding section
117 Error detecting section
200 Terminal
205 CRC section
208 Number-of-RBs-to-assign setting section
209 RBs-to-assign selecting section
210 RB assigning section
211 Multiplexing section

The invention claimed is:

1. A radio communication apparatus comprising:
a reception section that receives resource assignment information indicating whether or not a resource is assigned for each of a plurality of groups obtained by dividing a system band;
a setting section that sets a number of assignment resource blocks to use in an actual transmission band corresponding to a number of notified resource blocks through the resource assignment information into a number of resource blocks which can be represented by any of "$2^n \times 3^m \times 5^l$" (n, m and l are integers of zero or more), if the number of notified resource blocks cannot be represented by "$2^n \times 3^m \times 5^l$"; and
a selecting section that selects an assignment resource block to use in the actual transmission band based on the resource assignment information and the number of assignment resource blocks, wherein,
when the number of notified resource blocks is different and the number of assignment resource blocks is the same, the selecting section sets a combination of the assignment resource blocks to be a different combination depending on the number of notified resource blocks.

2. The radio communication apparatus according to claim 1, wherein the setting section sets, to the number of assignment resource blocks, a number of resource blocks which is the closest to the number of notified resource blocks and which can be represented by "$2^n \times 3^m \times 5^l$".

3. The radio communication apparatus according to claim 1, wherein the setting section sets, to the number of assignment resource blocks, a minimum number of resource blocks out of the numbers of resource blocks which are larger than the number of notified resource blocks and which can be represented by "$2^n \times 3^m \times 5^l$".

4. The radio communication apparatus according to claim 1, wherein the setting section sets, to the number of assignment resource blocks, a maximum number of resource blocks out of the numbers of resource blocks which are smaller than the number of notified resource blocks and which can be represented by "$2^n \times 3^m \times 5^l$".

5. The radio communication apparatus according to claim 1, wherein the selecting section selects the assignment resource block from any of the notified resource blocks on a low frequency side or a high frequency side.

6. The radio communication apparatus according to claim 1, wherein the selecting section selects the notified resource blocks on a high frequency side or a low frequency side of a cluster as resource block which are not utilized for the transmission band other than the assignment resource block.

7. The radio communication apparatus according to claim 1, wherein the selecting section selects a predetermined number of resource blocks out of the notified resource blocks on a low frequency side, as the assignment resource block.

8. A radio communication method comprising:
receiving resource assignment information indicating whether or not a resource is assigned for each of a plurality of groups obtained by dividing a system band;
setting a number of assignment resource blocks to use in an actual transmission band corresponding to a number of notified resource blocks through the resource assignment information into a number of resource blocks which can be represented by any of "$2^n \times 3^m \times 5^l$" (n, m and l are integers of zero or more), if the number of notified resource blocks cannot be represented by "$2^n \times 3^m \times 5^l$"; and
selecting an assignment resource block to use in the actual transmission band based on the resource assignment information and the number of assignment resource blocks, wherein,
when the number of notified resource blocks is different and the number of assignment resource blocks is the same, the selecting step sets a combination of the assignment resource blocks to be a different combination depending on the number of notified resource blocks.

* * * * *